Feb. 3, 1925.                                                        1,524,866
J. W. HUGHES
TIRE VULCANIZER
Filed Nov. 8, 1923                                3 Sheets-Sheet 2

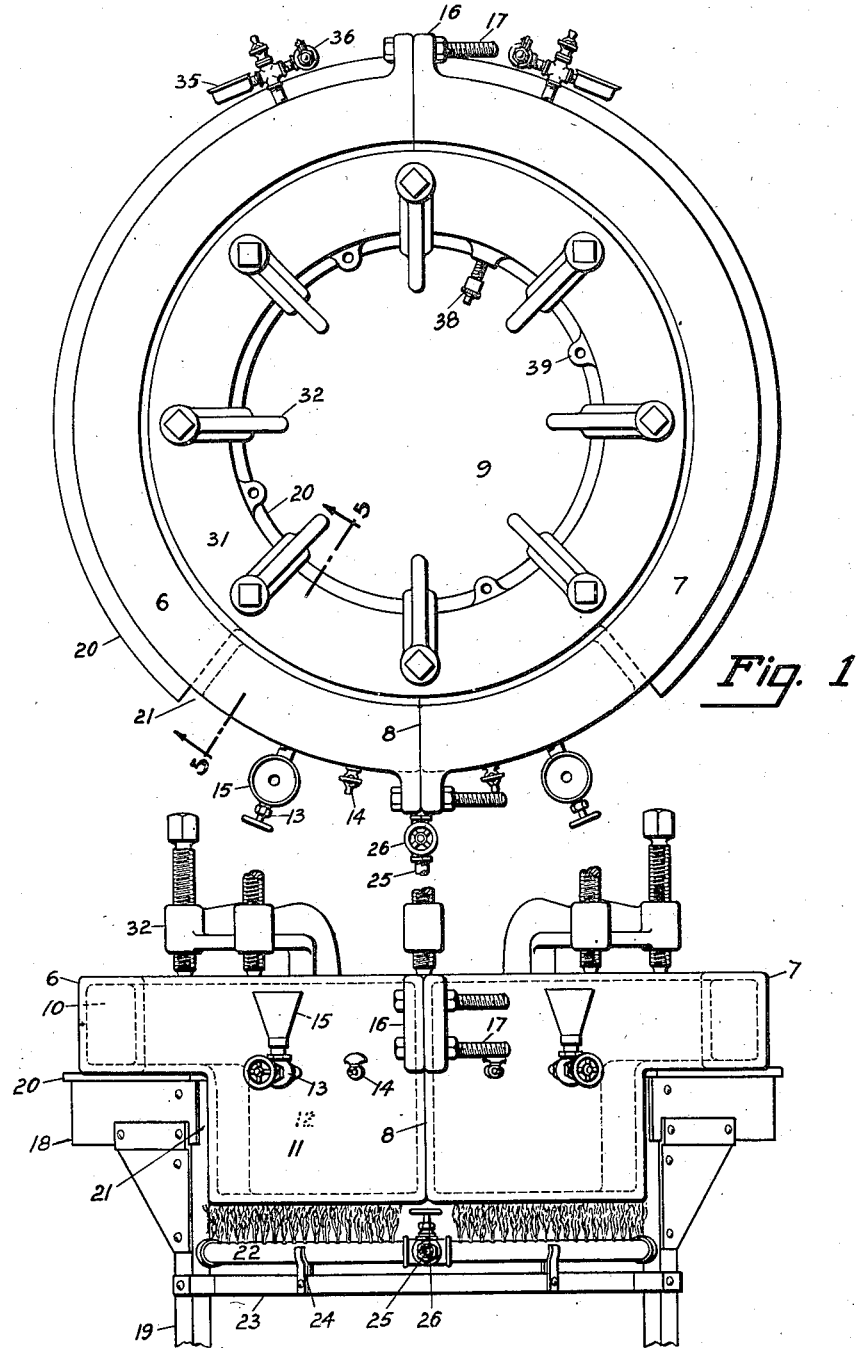

INVENTOR
John W. Hughes
BY
M. C. Frank

Feb. 3, 1925.                                                                    1,524,866
J. W. HUGHES
TIRE VULCANIZER
Filed Nov. 8, 1923                              3 Sheets-Sheet 3

INVENTOR
John W. Hughes
BY
M. C. Frank
ATTORNEY

Patented Feb. 3, 1925.

1,524,866

UNITED STATES PATENT OFFICE.

JOHN W. HUGHES, OF OAKLAND, CALIFORNIA, ASSIGNOR TO RUBBER PRODUCTS CORPORATION, OF OAKLAND, CALIFORNIA, A CORPORATION OF CALIFORNIA.

TIRE VULCANIZER.

Application filed November 8, 1923. Serial No. 673,513.

*To all whom it may concern:*

Be it known that I, JOHN W. HUGHES, a citizen of the United States, residing at Oakland, in the county of Alameda and State of California, have invented certain new and useful Improvements in Tire Vulcanizers, of which the following is a specification.

This invention relates broadly to tire vulcanizers, and in particular to an apparatus for vulcanizing automobile tires or for retreading the same when worn.

The customary practice of retreading tires is done in sections, and is accomplished in various ways and by means of several well-known makes of apparatus on the market and for this purpose; but none of these devices, with which I am familiar, accomplish the vulcanization process in a full-circle mold, and it is my chief object to produce a vulcanizer having a mold that will accommodate a nominal size tire and its over-sizes, and retread the same; the retreading being accomplished in one operation and without moving the tire within the mold, or briefly, in one set-up only.

In practice, the tread of a worn tire is cut away, and the carcass ground down approximately to the breaker strip to a smooth circumferential surface. The several layers of rubber stock are then stitched to the carcass in the same manner as in the building of a new tire. The tire thus prepared is now ready for positioning in my mold. The air bag placed within the tire casing is of full-circle construction and of the ordinary type used in the manufacture of new tires by the expansion process. The bag is filled with air to about 80 pounds pressure to bed and position the tire carcass in place within the mold.

My apparatus for accomplishing the vulcanization of the tire consists of an annular vulcanizer comprising two halved sections separate and distinct, and adapted to abut each other and embrace the mold members. Each section has a steam chamber communicating with an underlying water chamber situated above heating means for the steam generation necessary to produce heat and pressure to effect vulcanization.

The mold proper is provided with matrices adapted to fit within the annular vulcanizer, and consists of sections parted diametrically and circumferentially to allow the placement of the tire carcass therein, and which sections are adapted to be drawn together circumferentially by the means provided on the vulcanizer sections, and laterally by exterior clamps. The mold thus closed forms a continuous circular cavity. Parting rings are provided for placement between the matrices to accommodate oversize or wider tires in the same mold.

The bead rings and air bag shown and used in connection with this invention are of stock construction and on the market, but the mold, parting ring and vulcanizer sections including the steam generating means therefor, and the clamping and holding means for the matrices are new and novel features and come within the scope of this invention.

An important object of this invention is the provision of a tire retreading apparatus adapted to receive a tire of nominal size and its over-size, and other makes of tires having different widths and diameters that may vary more or less within limits, and retread the same in one operation.

Another object is the provision of an apparatus of the above character having steam generating means formed as a part thereof, thereby making the device a self-contained vulcanizer.

Another object is the provision of a mold which accomplishes the vulcanization and retreading of a tire in one continuous operation without changing or moving the tire within the mold.

Another object of the invention is to provide a vulcanizer with diametrically opposed mold sections that may be readily drawn together and matched with precision.

A further object is to construct a mold which may be expanded to adapt itself to different width tires and treads, by the simple expedient of an interchangeable spacing ring adapted for placement within the mold and between the matrices thereof, to space the said matrices the desired distance apart.

Other objects and advantages and the features of construction of the invention will appear in the subjoined description of the accompanying three sheets of drawings, in which:

Figure 1 is a plan of my improved tire retreading apparatus or vulcanizer shown in operating position.

Fig. 2 is an elevation showing the apparatus in place upon a supporting table and a burner positioned in the structure under the water chamber thereof. Part of the legs of the table are not shown.

Figure 3:
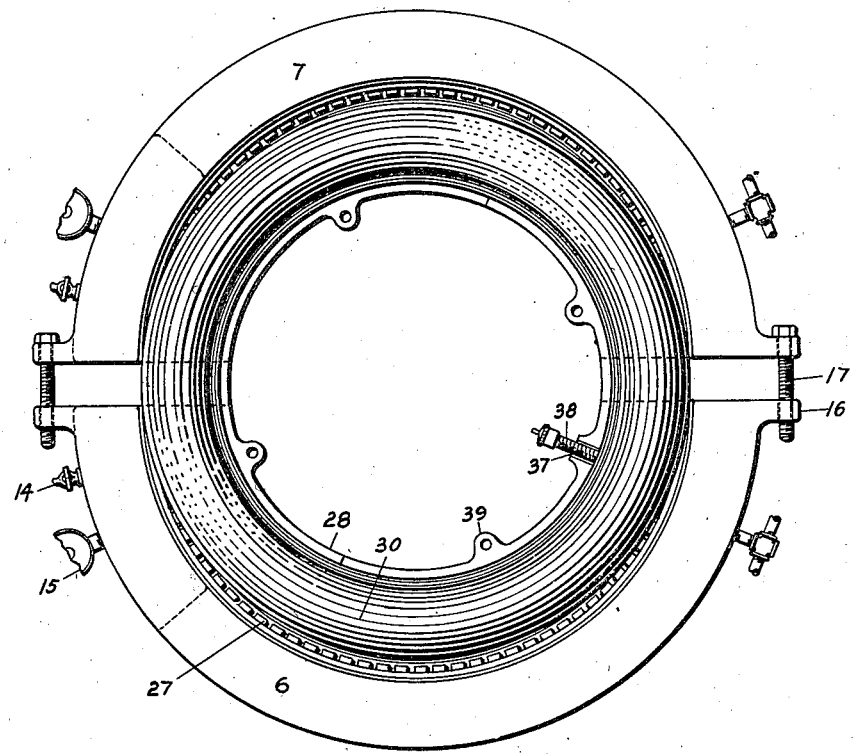
Fig. 3 is a plan illustrative of the apparatus when in open position; the tire is shown in the mold and centered on the bead ring.
Figure 4:
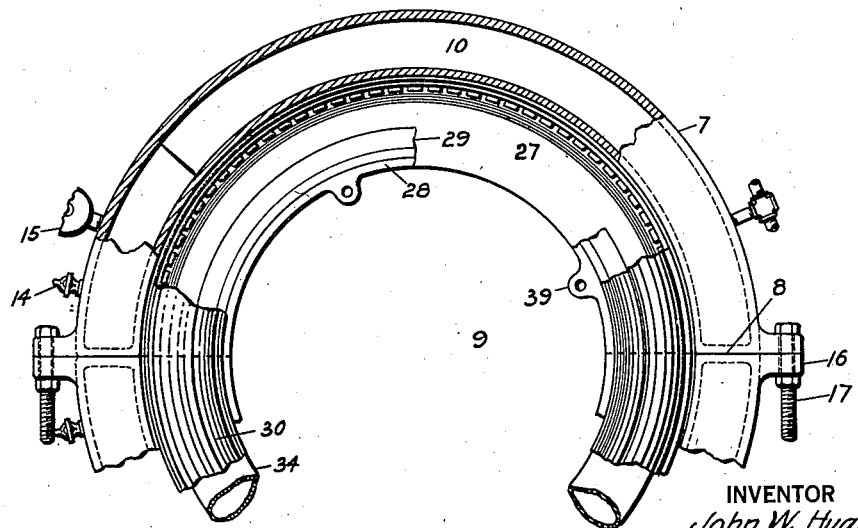
Fig. 4 is a partial and sectional plan of the apparatus in closed position to illustrate the different parts in corelation.

Adverting to the drawings and figures thereof: In carrying out the objects of this invention I have constructed the vulcanizer of the apparatus in halved sections 6 and 7. Said sections diametrically abut each other as at 8 and form a continuous circular opening 9. Each section is cored out to form a circumferential steam chamber 10 therein, to heat the mold to the proper temperature and which will be hereinafter more fully described.

A depending portion 11 extends from the halved sections respectively and is formed integral therewith, forming a water containing chamber 12 which communicates with the said steam chamber 10. Water is placed in these chambers to about the level with the bottom of the steam chamber.

Angle valves 13 are tapped into the walls of the sections in line with the drain cocks 14, and are provided with funnels 15 for filling the chambers 12 with water to the level of the drain cocks.

Flanges 16 are cast on the sections 6 and 7 to engage the long-threaded bolts 17, to draw the two sections together to embrace the mold members hereinafter described.

The above vulcanizing sections are supported in a horizontal position on a supporting table 18, having legs 19 and an annular top plate 20 upon which the sections 6 and 7 rest; the depending portions 11 extending through a cut-away portion 21 in the said plate and table.

A source of heat, such as a gas burner 22 is placed below the sections 6 and 7 of the vulcanizer, and consists of a portion of pipe bent in circular form and held in position by a cross brace 23 of the table by clips 24. The burner has an inlet pipe 25 and controlling valve 26 connected with a source of fuel supply (not shown).

The mold proper consists of two pairs of similar and interchangeable matrices, each matrix 27 thereof is alike. The said matrices are parted diametrically and circumferentially as shown in the figures, and when assembled in juxta-position within the opening 9 of the vulcanizer form a single and continuous uninterrupted matrix. As part of the mold are bead rings 28, consisting of sections diametrically and circumferentially parted to correspond with the matrices 27 and have inwardly extending flanges 29 for registering with and supporting the flanks of the casing 30.

The said rings together with the matrices form the mold for the casing 30 to be retreaded.

Figure 6:
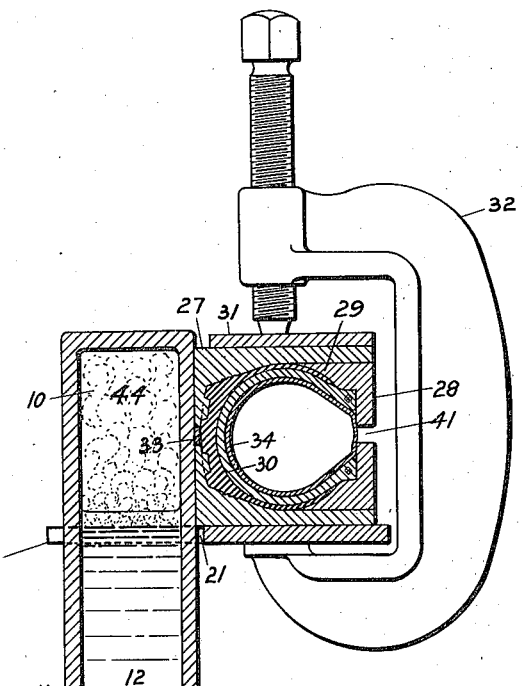
Fig. 6 is a sectional view analogous to Fig. 5, and shows the mold parts clamped to position and the vulcanization of the tread taking place by virtue of the steam in the steam chamber.

An annular pressure plate 31, shown clearly in Figs. 1 and 6, is placed upon the upper matrices when the vulcanizer is closed, and a series of screw clamps 32 are positioned over said plate 31 and under the top plate 20 of the supporting table 18. Said screw clamps embrace the mold parts and draw them laterally to position, as shown in Fig. 6.

Figure 5:
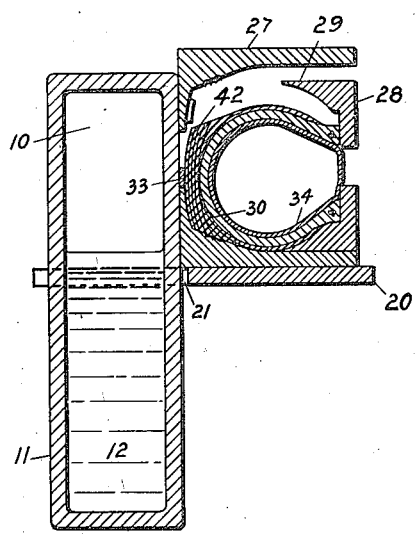
Fig. 5 is an enlarged vertical section taken upon the line 5—5 of Fig. 1, and shows the carcass with its stitched tread stock thereon in the lower matrix and bead ring, and the upper matrix and bead ring about to be positioned on the carcass previous to vulcanization. Water is shown in the water chamber.
Figure 8:
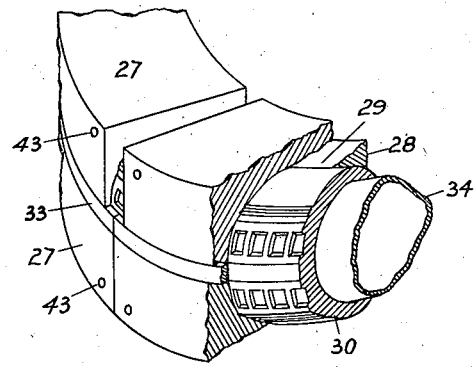
Fig. 8 is a partial perspective view of the mold proper removed from the vulcanizer and ready for disassemblage from the retreaded casing within.

The means for spacing the matrices 27 apart to accommodate the retreading of over-size or wider tires, consists of a spacing ring 33, preferably split, adapted for placement between the abutting faces of said matrices. Figs. 5, 6 and 8 show such a ring in position.

Figure 7:
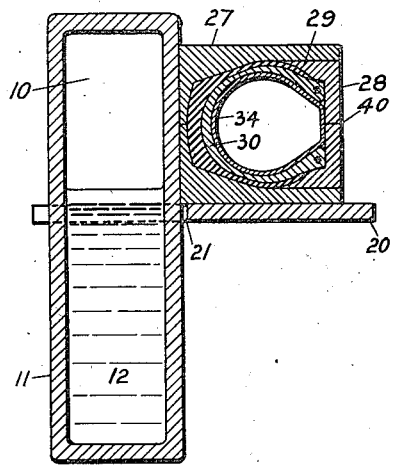
Fig. 7 is a sectional view similar to Figs. 5 and 6 with the matrices and bead rings in place upon a retreaded carcass after the operation of vulcanization has been completed. This arrangement shows the minimum width of the mold, the matrices and bead rings being in contact with each other respectively.

Fig. 7 shows a retreaded tire in place in the mold, and has its air bag 34 therein and inflated to the proper initial pressure to distend the casing to position in the mold. The tire illustrated in this instance is of nominal size, but the tire shown in Figs. 5, 6 and 8 is over-sized, and therefore requires the spacing ring 33 to accommodate it. The spacing ring will necessarily have to be made in several widths to suit the different widths of over-sized or irregular tires.

The pressure of the steam 44 in the chambers 10 is recorded by gauges 35, Fig. 1, tapped into the outer walls of sections 6 and 7, and pop-valves 36 are connected in communication with said gauges and set to release at approximately 45 pounds pressure.

In practice the apparatus requires about 30 minutes to heat from cold to the proper curing temperature and pressure, normally 40 pounds, and about one hour and ten minutes to cure the tire after heated to this degree.

Referring to Fig. 3 it will be noted that a radial groove 37 is formed in the bead rings 28, to allow the air valve 38 of the air bag 34 to extend through for inflating the said bag in the mold. Perforated lugs 39 are formed on the bead ring sections 28, and are adapted for use in lifting the entire mold out of the opening 9 when it is desired to remove the cured tire from the mold.

In Fig. 3 I have shown the various sections of the apparatus separated to the proper position for the reception of the prepared tire casing 30 to be retreaded. The nuts on the bolts 17 may be tightened to draw up the said sections, and the prepared casing is gradually compressed circumferentially and laterally and made to fit within the encircling unit matrix. The vertical clamps 32 are also tightened until the bead rings touch as at 40 Fig. 7, but if a spacing ring 33 is in the mold as in Fig. 6, the clamps are tightened until the width of the space 41 in said figure is the same width as that of the ring in question.

Fig. 5 shows the laminations 42 of stock rubber stitched to the carcass of the tire and ready for vulcanization.

After the tire has been cured and the mold withdrawn from the opening 9, the co-relative parts adhere to the cured tire, and it is necessary to separate them therefrom, and for this purpose I have provided sets of aligned holes 43 in the matrices 27 for the insertion of "spreader tongs" to facilitate the separation of the said parts.

Throughout the specification, by "oversize" is meant a nominal size tire and its variations in dimensions, due to the fact that the various manufactures of tires do not make the nominal size precisely the same; for example, a 34x4 tire (nominal size) may be of those dimensions precisely by one manufacturer, and be 34⅜x4⅛ by another, and it will be observed that my mold will accommodate such fluctuations by the tire being contracted therein by the circumferential and lateral pressure applied to the mold. Of course, in a group of tires such as 34x4, 34x4½ and 34x5, a ½" spacing ring and a 1" spacing ring would be required to be placed in the 34x4 mold to accommodate the latter two sizes respectively.

Also it is to be noted that a single vulcanizer can accommodate a series of molds, simply by producing molds having the same outside diameter and reduced cavity dimensions. The bead rings of the mold are shown halved diametrically, but in some cases of use I prefer to have them a full ring.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made, when desired, as fall within the scope of the appended claims.

Having thus described my invention, what I claim as new and desire to secure by Letters Patent of the United States, is the following:

1. A tire retreading apparatus comprising abutting halved vulcanizer sections having an opening therethrough, and a mold adapted to fit within the said opening consisting of matrices separable diametrically and circumferentially and bead rings separable circumferentially; and the said apparatus provided with means for drawing said halved sections and mold together to form a continuous circular cavity for the retreading of a tire.

2. A tire retreading apparatus comprising abutting half-circle vulcanizer sections having an opening therethrough, and a mold adapted to fit within the said opening consisting of top and bottom halved annular matrices inclosing annular bead rings, and means for clamping the said apparatus to position horizontally and vertically.

3. A tire vulcanizing apparatus comprising, an outer frame having halved sections adapted to abut each other to form an opening therethrough, a supporting table therefor, a mold adapted to fit within the said opening and be supported on the said table; and said mold comprising annular matrices and annular bead ring sections, the latter adapted to fit within said matrices; the said mold adapted to encompass a tire and the said apparatus provided with means for compressing said mold sections against the said tire, and means for generating steam in said outer frame for vulcanizing the tire in said mold.

4. A tire-tread vulcanizing apparatus comprising, hollow halved sections adapted to abut together and embrace a mold therebetween, said mold consisting of annular sectional matrices, annular bead ring sections, and a spacing ring adapted for insertion between said matrices; said mold adapted to receive a tire for retreading and means applied to said apparatus to contract the tire to position in the mold, and means for generating steam in said hollow sections to vulcanize the tire tread.

5. A tire retreading apparatus comprising hollow halved sections adapted to abut each other, a tread mold embraced by said sections consisting of top and bottom halved annular matrices inclosing annular bead rings, means for contracting said hollow sections and means for contracting and spacing-ring means for expanding the mold, and a supporting frame for said apparatus; said sections having steam and water chambers and provided with means for generating steam for tread vulcanization.

6. A tire retreading apparatus comprising hollow halved annular vulcanizer sections adapted to abut together, in combination with a sectional tread mold centrally located therein, said mold being separable diametrically and circumferentially and adapted for the reception of a normal size tire, and means for circumferentially drawing said hollow sections and sectional tread mold together, and means for bringing lateral pressure against said tread mold sections to force said sections inwardly against the tire therein.

7. A tire retreading apparatus comprising hollow halved annular vulcanizer sections, in combination with a sectional tread mold centrally located therein, said mold consisting of interchangeable top and bottom halved annular matrices inclosing annular bead rings and adapted for the reception of a nominal size tire at times, and a spacer ring for spreading said sectional tread mold to receive a wider tire at other times, and means for clamping said hollow halved sections and tread mold sections together circumferentially and laterally to compress either of said tires in the same mold.

8. In combination, a tire vulcanizer and a mold, a support therefor and a burner; the vulcanizer being in two similar sections halved diametrically and adapted for horizontal support and each section thereof having a steam chamber and a depending water chamber in communication therewith, and the burner adapted for application to said water chamber; the said mold adapted to be embraced by the steam chamber walls of the vulcanizer for vulcanizing the tire within the mold.

9. A full-circle tire-retreading apparatus, comprising a vulcanizer and a removable mold, the former consisting of two similar sections halved diametrically and adapted for horizontal support and further adapted to surround and embrace the mold, and said apparatus having a supporting table therefor and a heating element as a part thereof.

10. As an element of a tire vulcanizing apparatus of the character described, a vulcanizer consisting of two semi-circular sections adapted for horizontal support and to embrace a series of molds all having the same outside diameter but having cavities of different dimensions, the embracement enclosing but one mold at a vulcanization.

In testimony whereof I affix my signature.

JOHN W. HUGHES.